US009362777B2

(12) United States Patent
Lau et al.

(10) Patent No.: US 9,362,777 B2
(45) Date of Patent: Jun. 7, 2016

(54) PORTABLE WIRELESS CHARGING SYSTEM

(71) Applicants: Vincent W. S. Lau, Kowloon (HK); Lei Zheng, Kowloon (HK)

(72) Inventors: Vincent W. S. Lau, Kowloon (HK); Lei Zheng, Kowloon (HK)

(73) Assignee: Sun Pleasure Company Limited, Hong Kong (HK)

( * ) Notice: Subject to any disclaimer, the term of this patent is extended or adjusted under 35 U.S.C. 154(b) by 389 days.

(21) Appl. No.: 13/848,858

(22) Filed: Mar. 22, 2013

(65) Prior Publication Data

US 2013/0257368 A1    Oct. 3, 2013

(30) Foreign Application Priority Data

Mar. 23, 2012  (CN) .................. 2012 2 0114334 U

(51) Int. Cl.
*H02J 7/00* (2006.01)
*H01F 37/00* (2006.01)
*H02J 7/02* (2016.01)
*H01F 38/14* (2006.01)

(52) U.S. Cl.
CPC ............. *H02J 7/025* (2013.01); *H01F 38/14* (2013.01); *H02J 7/0044* (2013.01)

(58) Field of Classification Search
CPC .................................. H02J 7/025; H01F 38/14
USPC ......................................... 320/108; 307/104
See application file for complete search history.

(56) References Cited

U.S. PATENT DOCUMENTS

| 4,334,315 | A  | * | 6/1982  | Ono ................... H04B 1/385 128/201.19 |
| 8,629,651 | B2 | * | 1/2014  | Guccione et al. ............ 320/108 |
| 8,723,366 | B2 | * | 5/2014  | Fiorello ................. H01F 38/14 307/104 |
| 8,798,538 | B2 | * | 8/2014  | Han et al. .................... 455/41.1 |
| 8,901,880 | B2 | * | 12/2014 | Cook et al. ................... 320/108 |
| 2010/0201312 | A1 | * | 8/2010  | Kirby et al. .................. 320/108 |
| 2011/0050164 | A1 | * | 3/2011  | Partovi et al. ................ 320/108 |
| 2013/0281160 | A1 | * | 10/2013 | Han et al. ..................... 455/566 |
| 2013/0288600 | A1 | * | 10/2013 | Kuusilinna et al. ......... 455/41.2 |
| 2014/0132210 | A1 | * | 5/2014  | Partovi ......................... 320/108 |
| 2014/0265613 | A1 | * | 9/2014  | Jaskolski ............... H02J 17/00 307/104 |

* cited by examiner

*Primary Examiner* — M'Baye Diao
(74) *Attorney, Agent, or Firm* — Raymond Sun

(57) ABSTRACT

A portable wireless charging system is incorporated inside a carrying device that has a plurality of walls and an interior. The portable wireless charging system has a transmitter positioned at a first fixed location at an inner surface of one of the walls, a mobile power supply positioned adjacent the transmitter and electrically coupled to the transmitter, and a receiver positioned at a second fixed location at an outer surface of the one of walls, with the second fixed location aligned with the first fixed location. A barrier is positioned between the transmitter and the receiver, and a first pocket positioned at the outer surface about the second fixed location. A portable device that includes a battery to be charged can be retained inside the first pocket to be charged.

8 Claims, 6 Drawing Sheets

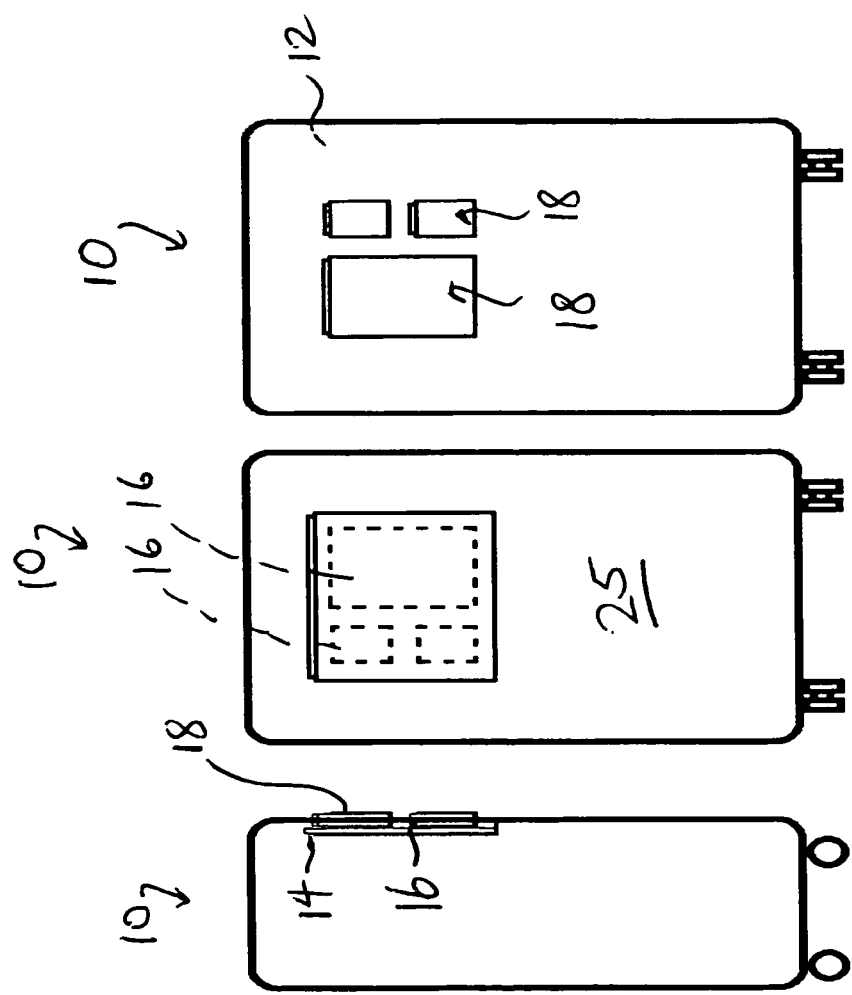

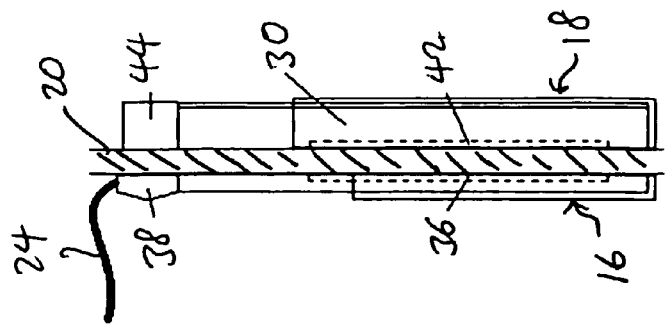
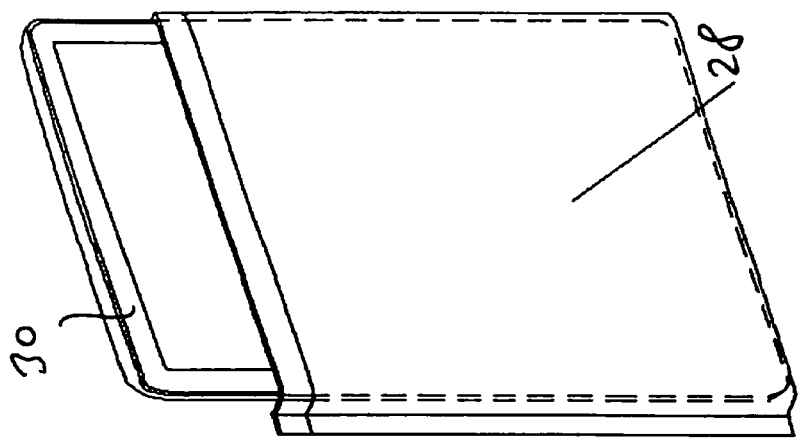
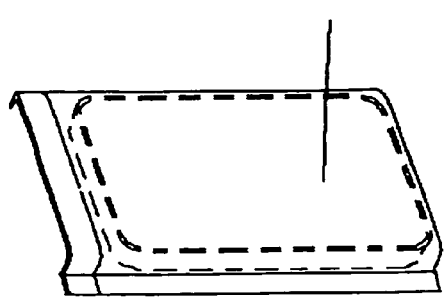

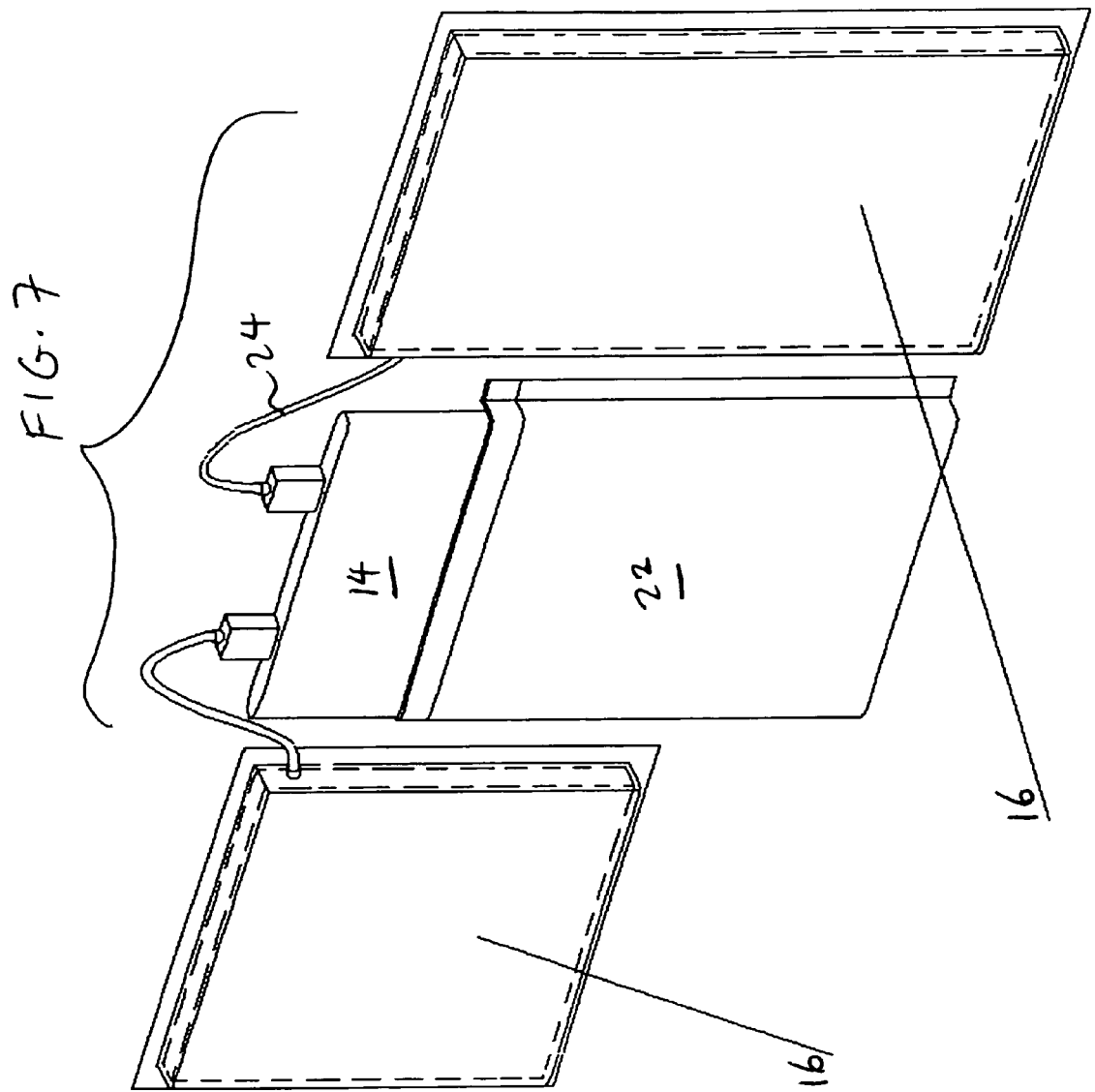

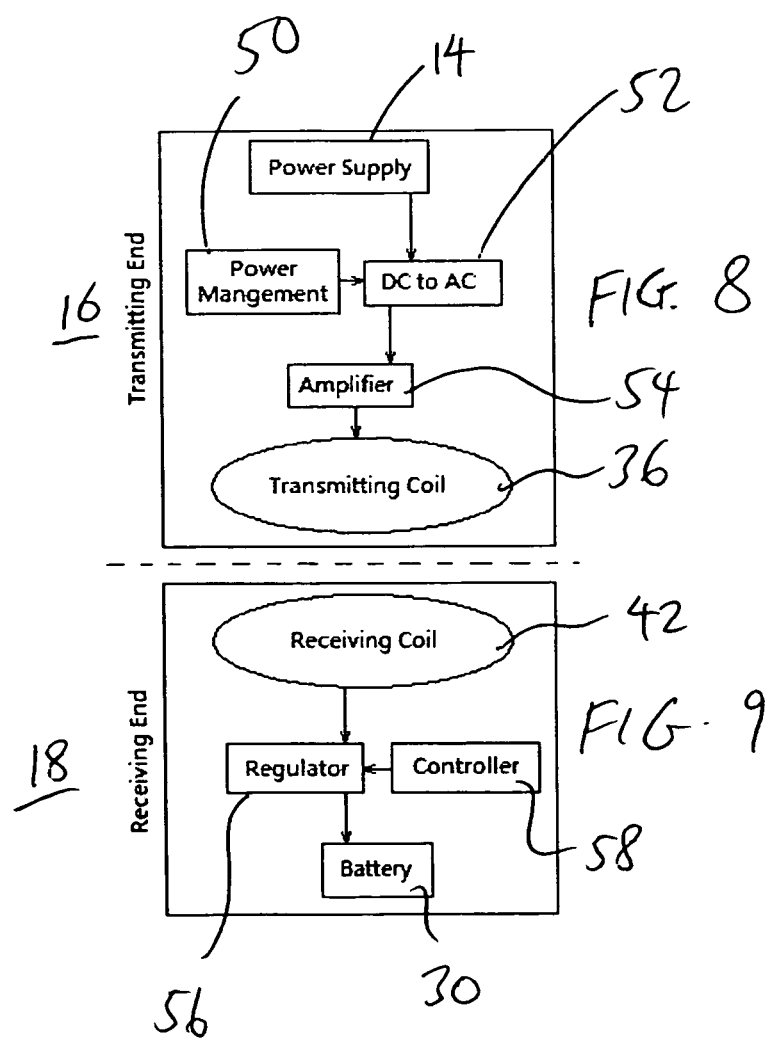

PORTABLE WIRELESS CHARGING SYSTEM

BACKGROUND OF THE INVENTION

1. Field of the Invention

The present invention relates to a portable wireless electrical charging system.

2. Description of the Prior Art

Science and technology are developing very rapidly in current society, and with the rapid development in electronic technology, more and more people use various portable electronic devices in work and life, and in order to enhance the extensiveness of the application of portable electronic equipment, the need for charging systems for the electronic devices is thereby increased.

Ever since the phenomenon of electromagnetic induction was revealed by scientists, electric energy has been transferred mainly through direct contact of the wires. Charging of electronic equipment has always been conducted through the plug and socket, and to accomplish wireless power supply without conductor contact between the power supply system and the electronic equipment has become a focus of research, particularly for charging and supplying power to high-power loads. The idea of wireless power transmission was put forth long ago, but was considered by many scientists to be impossible to accomplish. Because the electromagnetic energy sent from the transmitter is scattered and transmitted around, humans lack the capability for centralized control of the electromagnetic energy, let alone utilization of it. In November 2006, Marin Soljacic, an assistant professor in the Department of Physics, Massachusetts Institute of Technology (MIT) in the United States, put forward a new theory of utilizing electromagnetic energy through the technology of wireless electric power transmission. According to Soljacic's theory, so long as there is resonance generated between the electromagnetic transmitter and the receiving equipment in the same frequency, energy will be exchanged between them. The team led by him conducted experiments on this theoretical basis. Two copper wire coils were used as the resonator, with one coil connected with the power supply, as the transmitter; while the other in contact with a table lamp, was the receiver. As a result, they successfully lit a 60-watt electric lamp 2.13 m from the transmitter. However, the electromagnetic resonance coil is huge, and the two coils were required to be placed in a relatively fixed position. Furthermore, the transmission power was only 60 watts, the transmission efficiency of the electric energy was only 40% or so, and there was certain electromagnetic irradiation; therefore, it was only in a trial phase, and could not be promoted in a large area.

The drawbacks in the technology of wired power transmission and the technology of electric charging have affected development of social economy, and there is an urgent need to solve the problems mentioned above.

The technology of wireless charging originates from the technology of wireless electric transmission, transferring energy in the air between the charger and the device using magnetic resonance, with the coil and the capacitor forming resonance between the charger and the equipment, to accomplish the technology of highly efficient transmission of electric energy.

Because the transmission of the energy is based on near-field magnetic resonance, therefore the coil of the receiving end should receive as much as possible of the magnetic field sent out from the transmitting end. Correspondingly, every effort should be made to accomplish the following three objectives:

1. Because the strength of the magnetic field is inversely proportional to the distance from the transmitting end, the coil of the receiving end should be as close as possible to the transmitting end;

2. Because the magnetic flux plane of the coil is the largest at the transmitting end, the coil of the receiving end should be as parallel as possible with the plane of the coil of the transmitting end;

3. Because the magnetic field is strongest in the center of the coil of the transmitting end, the coil of the receiving end should be aligned as much as possible with the center of the coil of the transmitting end.

In recent years, experts in the field of wireless charging have attempted to use a no-automatic-alignment technology, a charging dock+rechargeable device mechanical structure alignment solution, and a charging dock+rechargeable device magnetic alignment solution.

As used herein, the terms "transmitting end" or "transmitter" mean the location or component from which electromagnetic charging energy is transmitted or emitted, and the terms "receiving end" or "receiver" mean the location or component where electrical charge is provided to a device to charge the device.

The no-automatic-alignment solution has a transmitting end that is essentially provided in the form of a plate, and where the coil of the transmitting end is inlaid inside the plate. The receiving end is placed directly on the plate of the transmitting end. This is the most common solution, and has the advantage is that it is simple. Unfortunately, this solution suffers from the disadvantage that if the device to be charged is not aligned properly, charging efficiency will be affected or, in the worst case, charging becomes absolutely impossible.

The charging dock +rechargeable device mechanical structure alignment solution is one where the transmitting end is a snap structure, and the coil of the transmitting end is inlaid inside the charging dock. The receiving end is mechanically snapped into position and fixed on the charging dock of the transmitting end. Such a solution is used for charging cordless toothbrushes and razors. The advantages of this solution are accurate positioning and fixing. The disadvantage is that the wireless transmission power is too low, which directly results in long charging times.

The charging dock+rechargeable device magnetic alignment solution is similar to the no-automatic-alignment solution, but where the magnet is placed in the center of the platform transmitting coil of the transmitting end. A corresponding magnet of polarity attraction is also placed in the center of the receiving coil of the loaded one. When the two magnets are close enough, they are accurately drawn together and aligned through magnetic attraction of the magnets. The advantage of this solution is accuracy in positioning and fixing. Further, when the transmitting end and the receiving end are close enough, the two will be drawn together and aligned with each other automatically. The disadvantage is that the receiving end must be placed on the charging plate during charging, and the entire charging system cannot be moved. Therefore, this solution is not good for mobile uses.

In short, for these three solutions, there is no guarantee of good transmission conditions from the transmitting end to the receiving end, the transmission power is lower, and the entire system cannot be moved during use.

SUMMARY OF THE DISCLOSURE

It is an object of the present invention to provide a portable wireless charging system that effectively improves the efficiency of non-contact inductive charging.

In order to accomplish the objects of the present invention, the present invention provides a portable wireless charging system that is incorporated inside a carrying device that has a plurality of walls and an interior. The portable wireless charging system has a transmitter positioned at a first fixed location at an inner surface of one of the walls, a mobile power supply positioned adjacent the transmitter and electrically coupled to the transmitter, and a receiver positioned at a second fixed location at an outer surface of the one of walls, with the second fixed location aligned with the first fixed location. A barrier is positioned between the transmitter and the receiver, and a first pocket positioned at the outer surface about the second fixed location. A portable device that includes a battery o be charged can be retained inside the first pocket to be charged.

BRIEF DESCRIPTION OF THE DRAWINGS

FIG. 1 is a front plan view of a box in which the portable wireless charging system according to the present invention is embodied.

FIG. 2 is a plan view of the interior of the box of FIG, 1.

FIG. 3 is a cross-sectional side view of the box of FIG. 1.

FIGS. 4 and 5 illustrate two different pockets that can be used at the receiving end of the system of the present invention.

FIG. 6 is a cross-sectional view illustrating the construction of the transmitting end and the receiving end at the location of the barrier.

FIG. 7 illustrates the components of the system at the transmitting end.

FIG. 8 is a schematic diagram illustrating the components of the system at the transmitting end.

FIG. 9 is a schematic diagram illustrating the components of the system at the receiving end.

DETAILED DESCRIPTION OF THE PREFERRED EMBODIMENTS

Figure 10:
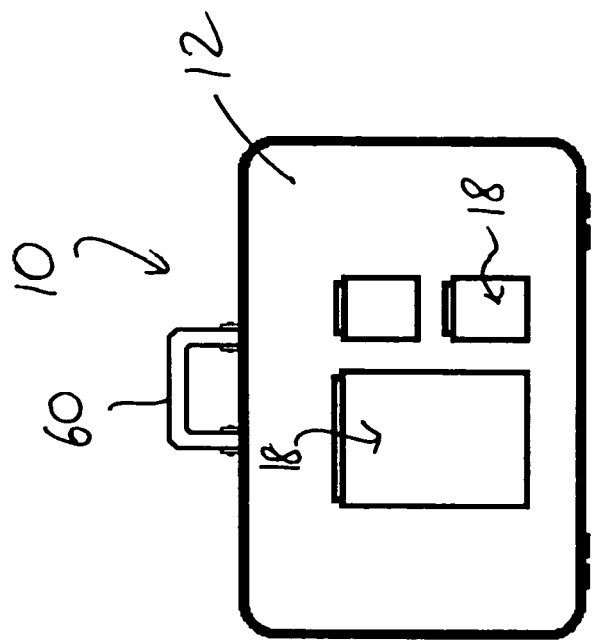
FIG. 10 is a front plan view of a bag in which the portable wireless charging system according to the present invention is embodied.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims, The present invention provides a portable wireless charging system that can be embodied in a carrying box or bag. Referring to FIGS. 1-7, the system 10 includes a carrying box 12, an aluminum-encased mobile power supply 14, a plurality of transmitters 16, a plurality of receivers 18, and a barrier 20 between the transmitters 16 and the receivers 18.

The box 10 can be embodied as a conventional box or travel case (e.g., luggage) that is made of metal, aluminum, cloth, nylon, polyester or plastic. The box 10 has a plurality of walls. Referring to FIG. 7, a mobile power supply retaining pocket 22 can be provided in the interior of the box 10, and stitched or otherwise secured to the inner surface of one of the walls 25 of the box 10. The mobile power supply 14 can be retained inside the pocket 22. A plurality of transmitters 16 are secured to the inner surface of the box 10 adjacent the mobile power supply 14, as shown in FIG. 7. A wired connection 24 can be used to connect the mobile power supply 14 to the transmitters 16.

Referring to FIGS. 1 and 4-5, a plurality of retaining pockets 26, 28 can be stitched or otherwise secured to the outer surface of the box 10 at locations corresponding to the transmitters 16. In other words, these pockets 26, 28 are positioned on the other side of the barrier 20 from the transmitters 16. These pockets 22, 26 and 28 can be elastic. The pockets 26, 28 are provided for retaining different types of devices for charging. For example, FIG. 4 illustrates a pocket 26 that is adapted to receive a smaller device 30 (e.g., handphone) for charging, and FIG. 5 illustrates a pocket 28 that is adapted to receive a larger device 30 (e.g., electronic pad) for charging. Positioned inside each pocket 26, 28 is a receiver 18, such that the area in the pocket 26, 28 becomes a receiving end.

The barrier 20 can be a portion of the wall 25 of the bag 10 at the location of the transmitters 16 and receivers 18, and the characteristics of the material allow for magnetic waves to be transmitted therethrough from the transmitter 16 to the corresponding receiver 18. The barrier 20 should be made of a non-ferric metal (e.g., aluminum) or other non-mental material, such as cloth, nylon, polyester, plastic, etc. Otherwise, a metal which is ferric (e.g., iron, nickel, cobalt, some alloys of rare earth metal) may absorb the magnetic field from the transmitting.

FIG. 6 illustrates the construction of the transmitter 16 and the receiver 18 at the location of the barrier 20. The transmitter 16 includes a coil 36 which is coupled to the transmitter electronics 38. The coil 36 is housed in a housing. The transmitter electronics 38 is in turn coupled to the mobile power supply 14 via the wired connection 24. FIG. 8 illustrates the electronic components on the transmitting end, where the transmitter electronics 38 includes a power management circuit 50, a DC-to-AC converter 52, and an amplifier 54. The power from the mobile power supply 14 is converted by the converter 52 with control by the power management circuit 50, and then provided to an amplifier 54 before delivery to the transmitting coil 36.

The receiver 18 includes a coil 42 which is coupled to the receiver electronics 44. The coil 42 is housed in a housing. FIG. 9 illustrates the electronic components on the receiving end, where the receiver electronics 44 includes a regulator 56 and a controller 58. The regulator 56 is coupled to the receiving coil 42 to regulate the power output received from the coil 42 with the assistance of the controller 58. The power from the regulator 56 is then provided to charge the battery in the device 30.

Thus, electromagnetic force is generated by the transmitter coil 36. The receiver coil 42 receives the electromagnetic energy and converts it into the electric energy.

The system 10 is used in the following manner. The mobile power supply 14 and transmitters 16 are positioned on one side of the barrier 20. The device 30 to be charged is placed in one of the pockets 26 or 28. The pocket 26 or 28 retains the device 30 at a fixed and secure position so that the device 30 does not move with respect to the location of the transmitter 16, thereby keeping the device 30 in alignment with the transmitter 16. To initiate charging, the system 10 can provide a switch (not shown) that can be actuated by the user, or the system 10 can have an automatic detection mechanism which automatically detects the presence of the device 30 and initiates charging.

Figure 11:
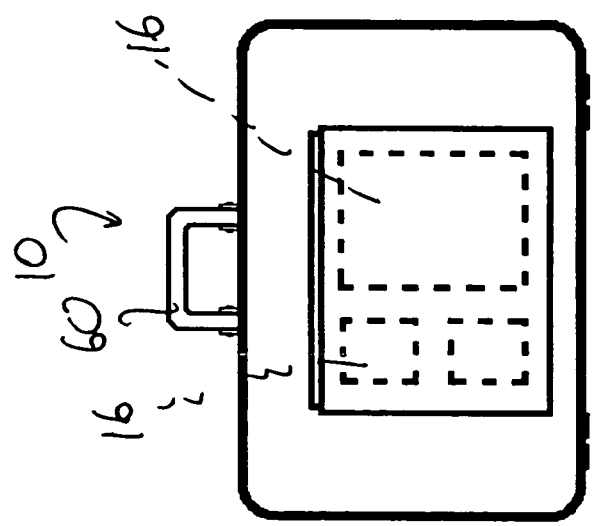
FIG. 11 is a plan view of the interior of the bag of FIG. 11.

FIGS. 10 and 11 illustrate the system 10 embodied in the form of a carrying bag having handles 60. The construction of the charging system 10 inside the bag is the same as in FIGS. 1-7 above.

As an alternative, it is possible to provide the transmitters 16 and receivers 18 in a portable manner where they can be moved to a different location. For example, the transmitters 16 and 18 do not need to be stitched or secured at the locations of the wall 25. Pockets (not shown) can be provided at locations of the inner surface of the wall 25 occupied by the transmitters 16 in FIG. 7, and each portable transmitter 16 can be retained in a separate pocket. Similarly, the receivers 18 do not need to be stitched or secured to the outer surface of the wall 25. Each portable receiver 18 can be retained in a separate pocket 26 or 28. In such an embodiment, magnets with opposing polarity can be provided in the housings of the portable transmitters 16 and the portable receivers 18 so that the housings of the portable transmitters 16 and the portable receivers 18 can be attracted towards each other, and therefore aligned with each other.

Figure 12:
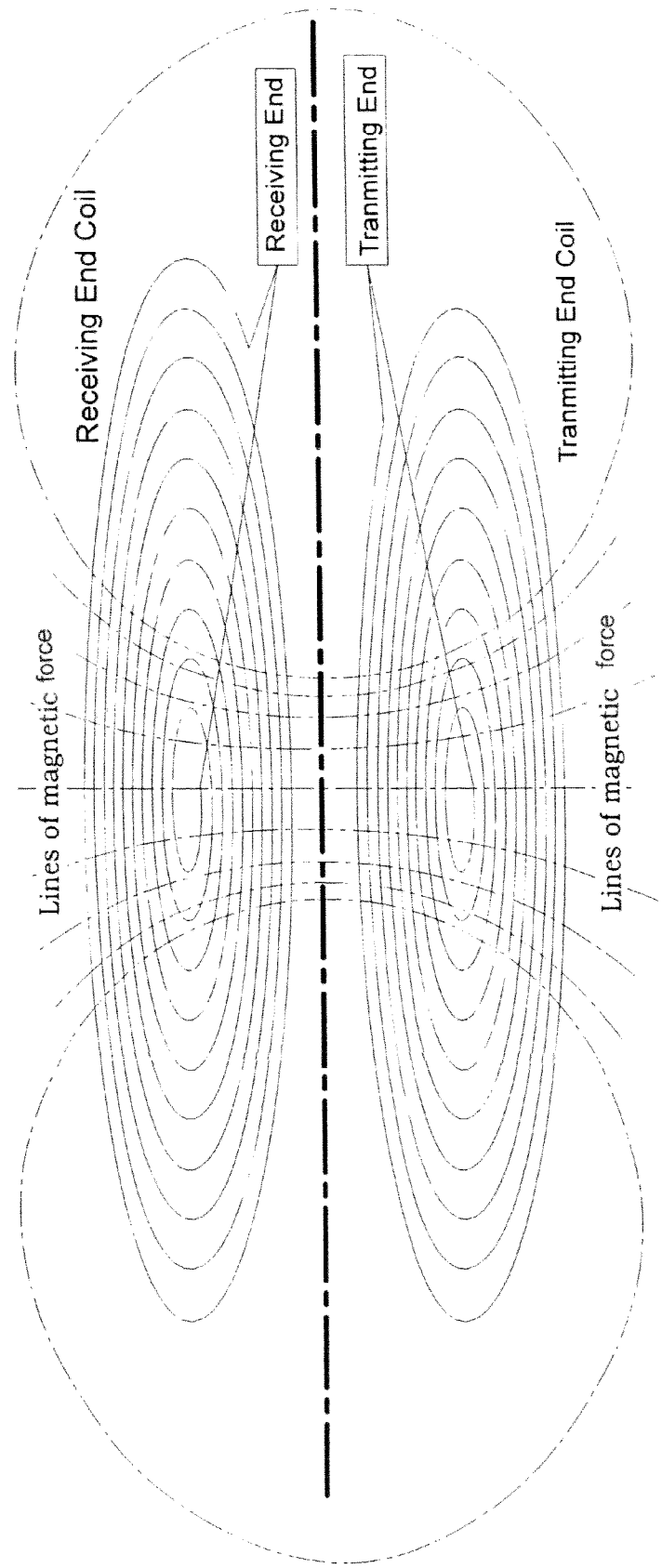
FIG. 12 illustrates the magnetic field created by the transmitting end and the receiving end of system of the present invention.

FIG. 12 illustrates the magnetic field created by the transmitting end and the receiving end of system 10 of the present invention.

The present invention can be implemented inside any pocket or compartment of any type of carrying case of any size. Thus, when compared with existing technology, the present invention provides the following benefits:

The mobile power supply 14 serves as the power supply for the entire system 10, so that the entire system 10 can be portable and moved around at will, as well as providing sufficient power for the entire charging system.

With the use of the pockets 22, 26 and 28, the transmitting end and the receiving end are all fixed and aligned, ensuring good performance of wireless energy transmission, thereby ensuring good charging efficiency of the entire system.

Because the mobile power supply 14 itself has an aluminum metal casing, it provides good wireless shielding performance. When it is placed between the user and the transmitting end, irradiation of the user by the transmitting end can be blocked.

The mobile power supply 14 itself has an output load detection, and when there is no load at the receiving end or the power consumption is too low because charging is complete, it will automatically shut off the output, thereby conserving energy.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A portable wireless charging system, comprising:
    a carrying device having a plurality of walls and an interior;
    a transmitter positioned at a first fixed location at an inner surface of one of the plurality of walls inside the carrying device;
    a mobile power supply positioned adjacent the transmitter inside the carrying device and electrically coupled to the transmitter;
    a receiver positioned at a second fixed location at an outer surface of the one of the plurality of walls outside the carrying device, with the second fixed location aligned with and directly opposite to the first fixed location;
    a barrier positioned between the transmitter and the receiver; and
    a first pocket positioned at the outer surface of the carrying device about the second fixed location.

2. The system of claim 1, further including a power supply pocket positioned at the inner surface about the location of the mobile power supply, with the mobile power supply retained inside the power supply pocket.

3. The system of claim 1, further including another transmitter positioned at a third fixed location at the inner surface, another receiver positioned at a fourth fixed location at the outer surface, and a second pocket positioned at the outer surface about the fourth fixed location, with the first and third pockets having different sizes.

4. The system of claim 1, wherein the transmitter includes a magnetic coil.

5. The system of claim 4, wherein the receiver includes a magnetic coil.

6. The system of claim 1, further including a portable device that includes a battery to be charged, the portable device retained inside the first pocket.

7. The system of claim 1, wherein the carrying case is a piece of luggage.

8. The system of claim 1, wherein the carrying case is a box.

* * * * *